(12) United States Patent
Watanabe et al.

(10) Patent No.: US 11,472,406 B2
(45) Date of Patent: Oct. 18, 2022

(54) VEHICLE CONTROL APPARATUS, VEHICLE, AND VEHICLE CONTROL METHOD

(71) Applicant: HONDA MOTOR CO., LTD., Tokyo (JP)

(72) Inventors: Seiji Watanabe, Wako (JP); Tatsuya Arikai, Wako (JP); Takuyuki Mukai, Wako (JP); Hiroyuki Nakashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 17/126,192

(22) Filed: Dec. 18, 2020

(65) Prior Publication Data
US 2021/0197812 A1  Jul. 1, 2021

(30) Foreign Application Priority Data
Dec. 27, 2019  (JP) .............................. JP2019-238923

(51) Int. Cl.
*B60W 30/12* (2020.01)
*B60W 60/00* (2020.01)
*B60W 50/00* (2006.01)
*G06V 20/58* (2022.01)

(52) U.S. Cl.
CPC ............ *B60W 30/12* (2013.01); *B60W 50/00* (2013.01); *B60W 60/0053* (2020.02); *B60W 60/0059* (2020.02); *G06V 20/58* (2022.01); *B60W 2050/0054* (2013.01)

(58) Field of Classification Search
CPC .... B60W 30/12; B60W 50/00; B60W 6/0053; B60W 60/0059; B60W 2050/0054; B60W 50/0205; G06V 20/58; G06V 20/56
See application file for complete search history.

(56) References Cited

U.S. PATENT DOCUMENTS

| 2018/0299894 | A1* | 10/2018 | Takase ................. G05D 1/0088 |
| 2019/0300009 | A1* | 10/2019 | Sakamoto ......... B60W 50/0098 |
| 2021/0122384 | A1* | 4/2021 | Toda ................... B60W 50/029 |

FOREIGN PATENT DOCUMENTS

JP        2017-196965 A      11/2017

* cited by examiner

*Primary Examiner* — James J Lee
*Assistant Examiner* — Andrew Sang Kim
(74) *Attorney, Agent, or Firm* — Thomas | Horstemeyer, LLP

(57) ABSTRACT

A vehicle control apparatus comprises: a path deviation determination unit configured to output a request signal for requesting driving takeover if a deviation amount of information representing a traveling state with respect to a target track is not less than a first threshold; and an operation monitoring unit configured to monitor processing of the path deviation determination unit. The operation monitoring unit determines that an abnormality has occurred in the path deviation determination unit if the deviation amount of the information representing the traveling state with respect to the target track is not less than a second threshold larger than the first threshold, and a state in which the request signal is not output continues for a predetermined period.

6 Claims, 9 Drawing Sheets

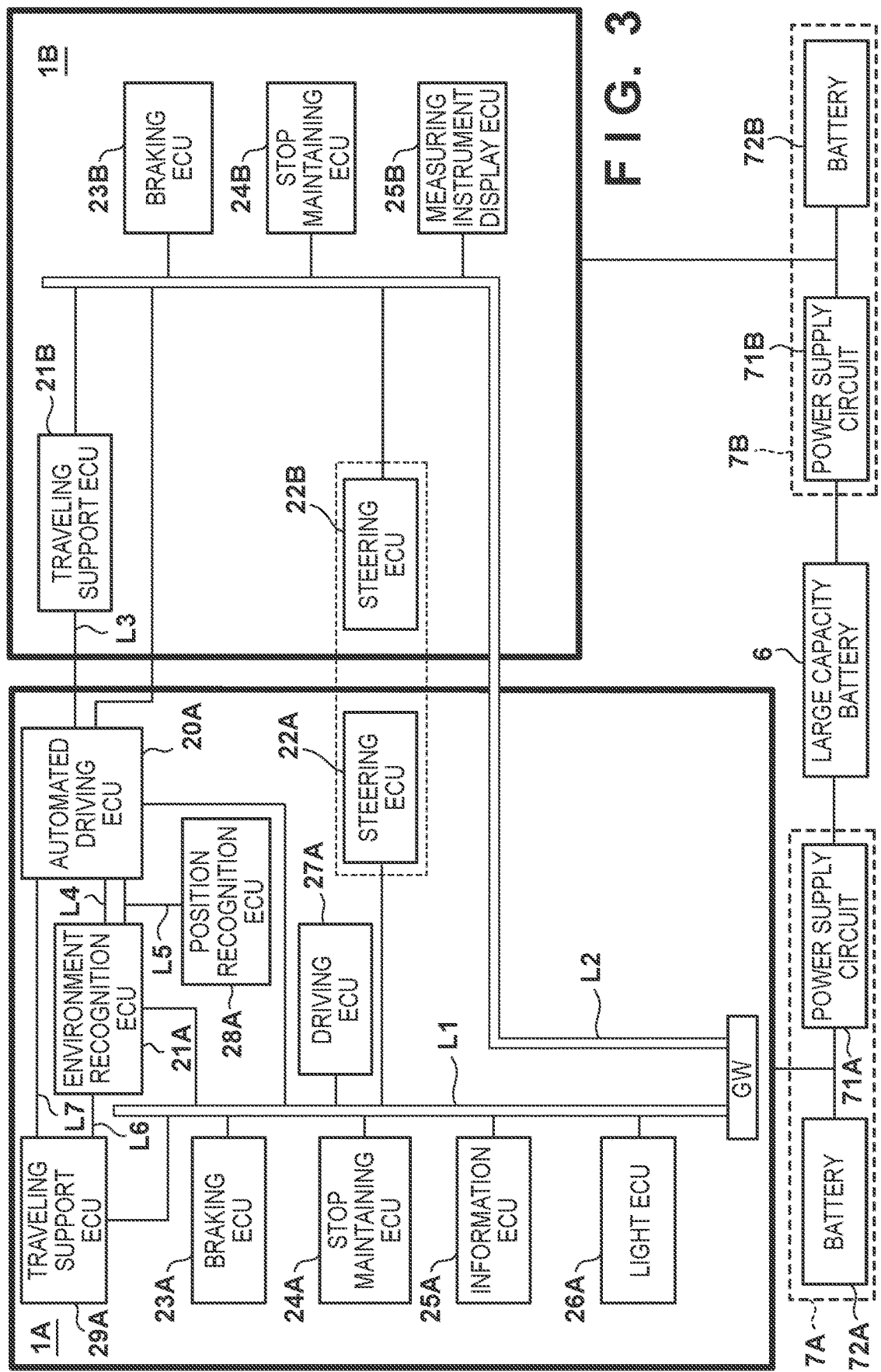

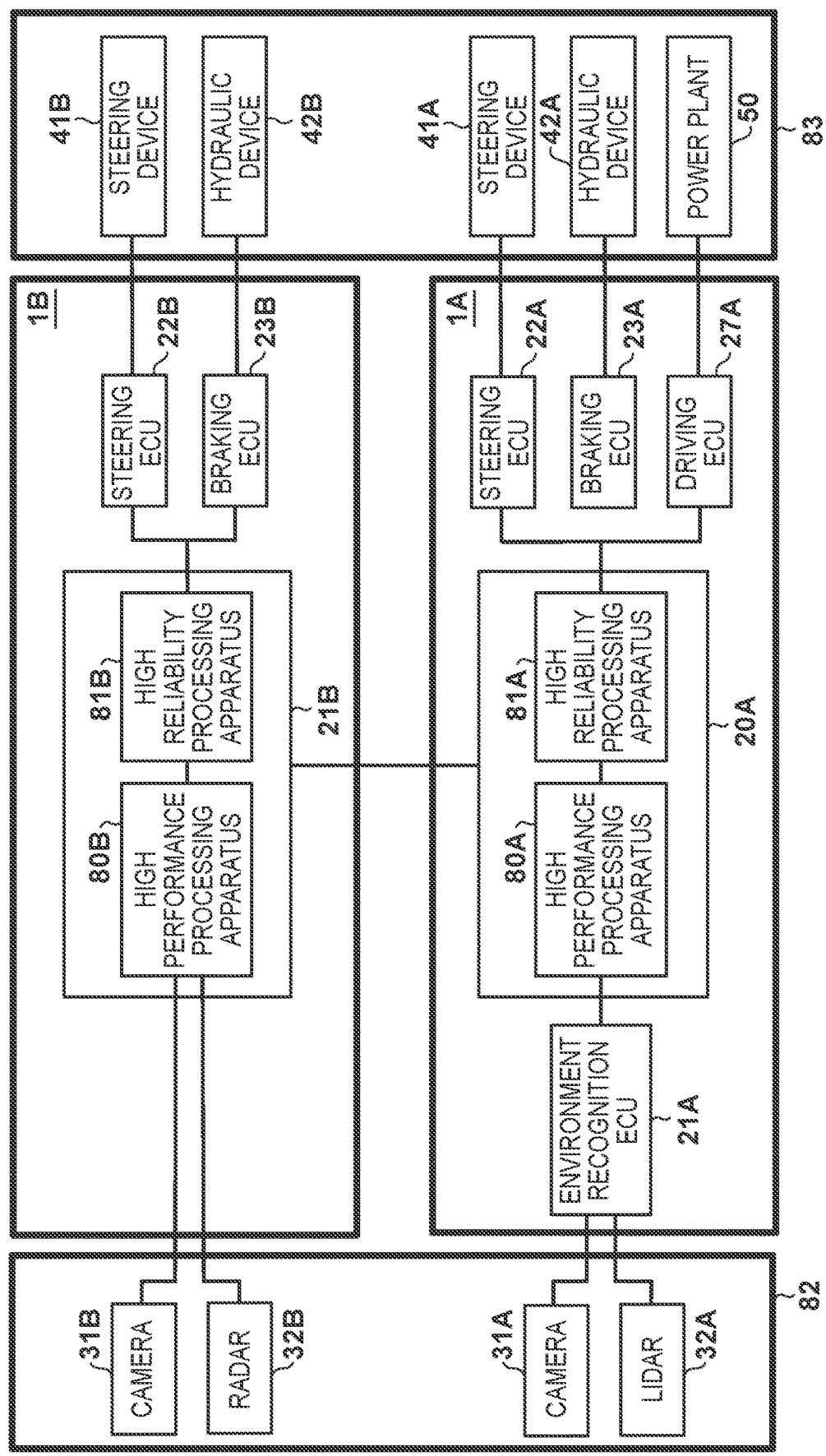

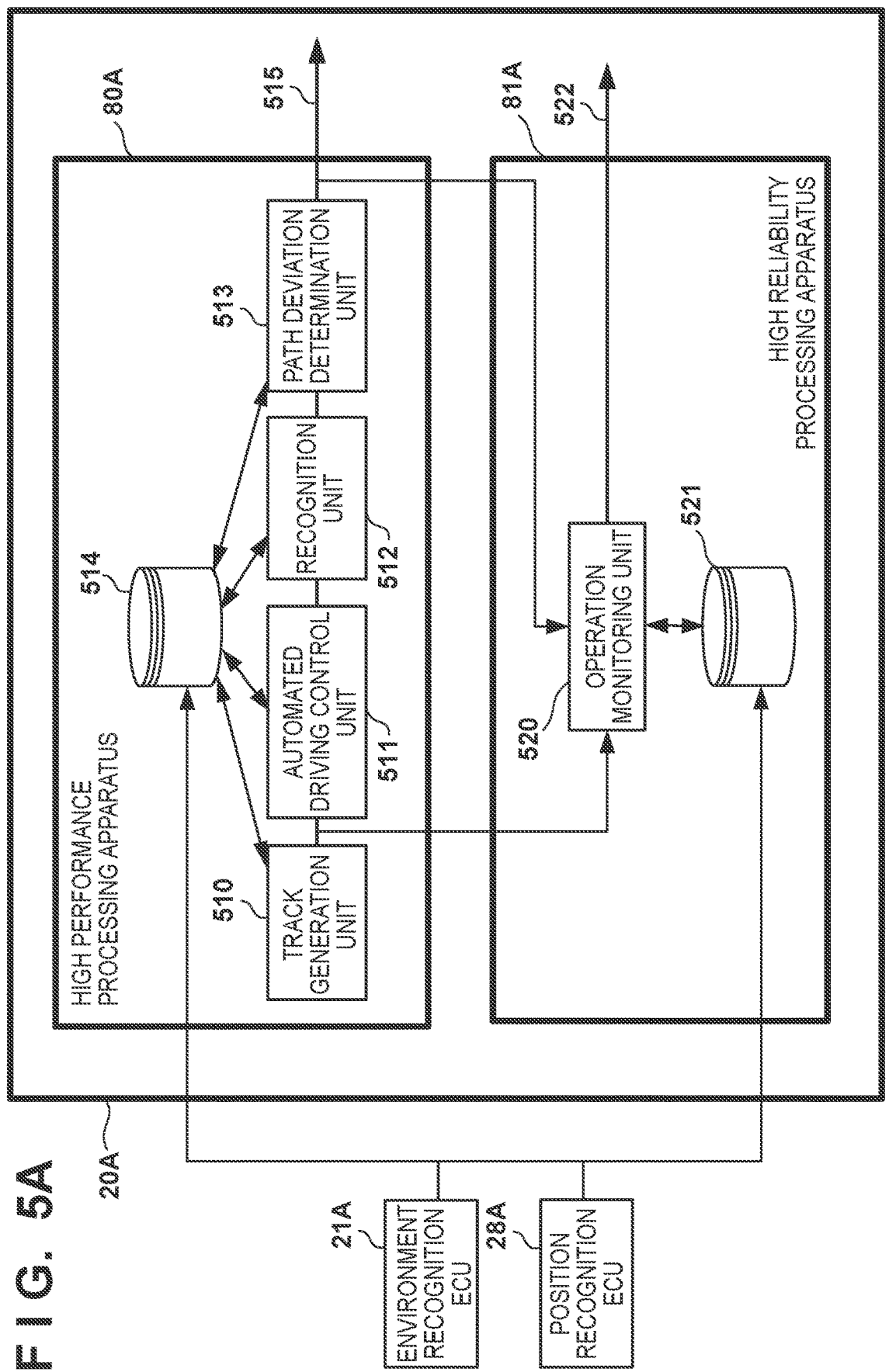

VEHICLE CONTROL APPARATUS, VEHICLE, AND VEHICLE CONTROL METHOD

CROSS-REFERENCE TO RELATED APPLICATION(S)

This application claims priority to and the benefit of Japanese Patent Application No. 2019-238923 filed on Dec. 27, 2019, the entire disclosure of which is incorporated herein by reference.

BACKGROUND OF THE INVENTION

Field of the Invention

The present invention relates to a vehicle control apparatus, a vehicle, and a vehicle control method and, more particularly, to a vehicle control technique for an automated driving vehicle.

Description of the Related Art

Japanese Patent Laid-Open No. 2017-196965 discloses an automated driving control apparatus including a main ECU and a sub ECU. In the automated driving control apparatus of Japanese Patent Laid-Open No. 2017-196965, if a failure detection unit detects a failure in any ECU, which one of the operation amount of the main ECU and that of the sub ECU is to be used is selected based on the result, and automated driving control is executed based on the operation amount.

In the arrangement of Japanese Patent Laid-Open No. 2017-196965, the failure of the ECU is detected by comparing an operation amount calculated in the current period with an operation amount calculated in the previous period. For this reason, if an abnormality has occurred in the first control period, failure detection cannot be performed. Additionally, if an abrupt variation occurs in the operation amount based on the normal operation of the ECU to cope with an abrupt movement of a vehicle in an unintended state, which is caused by the influence of the external environment such as a cross wind, a failure of the ECU may erroneously be detected by comparison with a previous operation amount.

The automated driving control apparatus of Japanese Patent Laid-Open No. 2017-196965 detects a failure based on comparison between calculation in the current period and calculation in the previous period. For example, if a failure state continues in which a request signal for requesting driving takeover is not output notwithstanding a deviation from a target track, this state cannot be detected as a failure if a different is not generated in the operation amount of the calculation result.

The present invention provides a vehicle control technique capable of determining an abnormal state in which a request signal for requesting driving takeover is not output notwithstanding a deviation from a target track.

SUMMARY OF THE INVENTION

According to one aspect of the present invention, there is provided a vehicle control apparatus comprising: a track generation unit configured to generate a target track of a vehicle; an automated driving control unit configured to perform automated driving control of automatically controlling steering of the vehicle based on the target track generated by the track generation unit; a recognition unit configured to recognize a traveling state of the vehicle traveling based on the automated driving control; and a path deviation determination unit configured to output a request signal for requesting driving takeover if a deviation amount of information representing the traveling state with respect to the target track is not less than a first threshold, the apparatus further comprising an operation monitoring unit configured to monitor processing of the path deviation determination unit, wherein the operation monitoring unit determines that an abnormality has occurred in the path deviation determination unit if the deviation amount of the information representing the traveling state with respect to the target track, which is calculated using the information representing the traveling state of the vehicle and the target track, is not less than a second threshold larger than the first threshold, and a state in which the request signal is not output continues for a predetermined period.

According to another aspect of the present invention, there is provided a vehicle control method of a vehicle control apparatus including a track generation unit configured to generate a target track of a vehicle, an automated driving control unit configured to perform automated driving control of automatically controlling steering of the vehicle based on the target track generated by the track generation unit, a recognition unit configured to recognize a traveling state of the vehicle traveling based on the automated driving control, a path deviation determination unit, and an operation monitoring unit, the method comprising steps of:

outputting, by the path deviation determination unit, a request signal for requesting driving takeover if a deviation amount of information representing the traveling state with respect to the target track is not less than a first threshold; and monitoring processing of the path deviation determination unit by the operation monitoring unit, wherein in the step of monitoring, if the deviation amount of the information representing the traveling state with respect to the target track, which is calculated using the information representing the traveling state of the vehicle and the target track, is not less than a second threshold larger than the first threshold, and a state in which the request signal is not output continues for a predetermined period, it is determined that an abnormality has occurred in the path deviation determination unit.

According to the present invention, it is possible to determine an abnormal state in which a request signal for requesting driving takeover is not output notwithstanding a deviation from a target track.

BRIEF DESCRIPTION OF THE DRAWINGS

FIG. 3 is a block diagram of the vehicle control system according to the embodiment;

FIG. 4 is a block diagram of the vehicle control system according to the embodiment;

FIG. 5A is a block diagram showing the functional arrangement of a vehicle control apparatus according to the embodiment;

DESCRIPTION OF THE EMBODIMENTS

Figure 1:
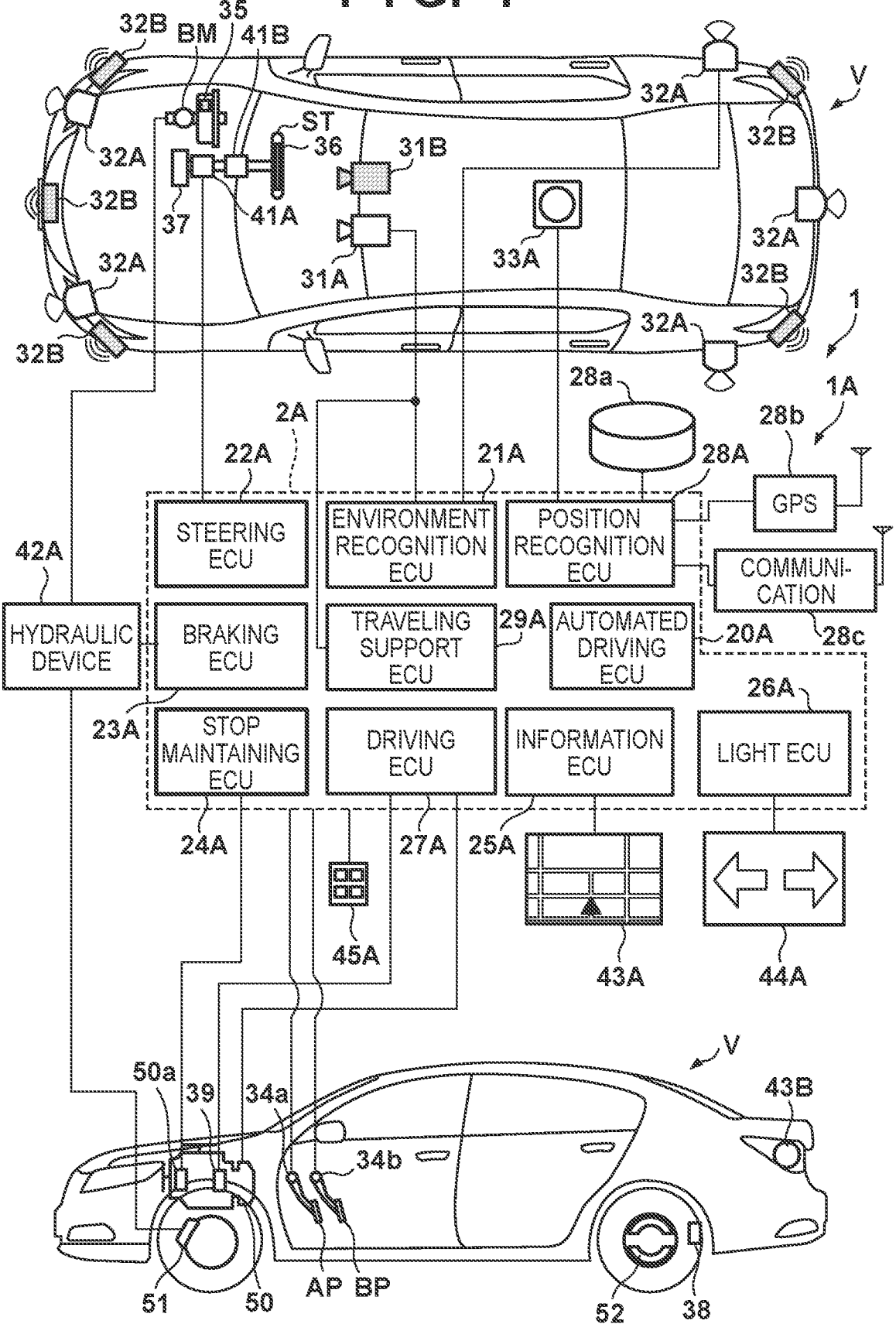
FIG. 1 is a block diagram of a vehicle control system according to an embodiment.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 2:
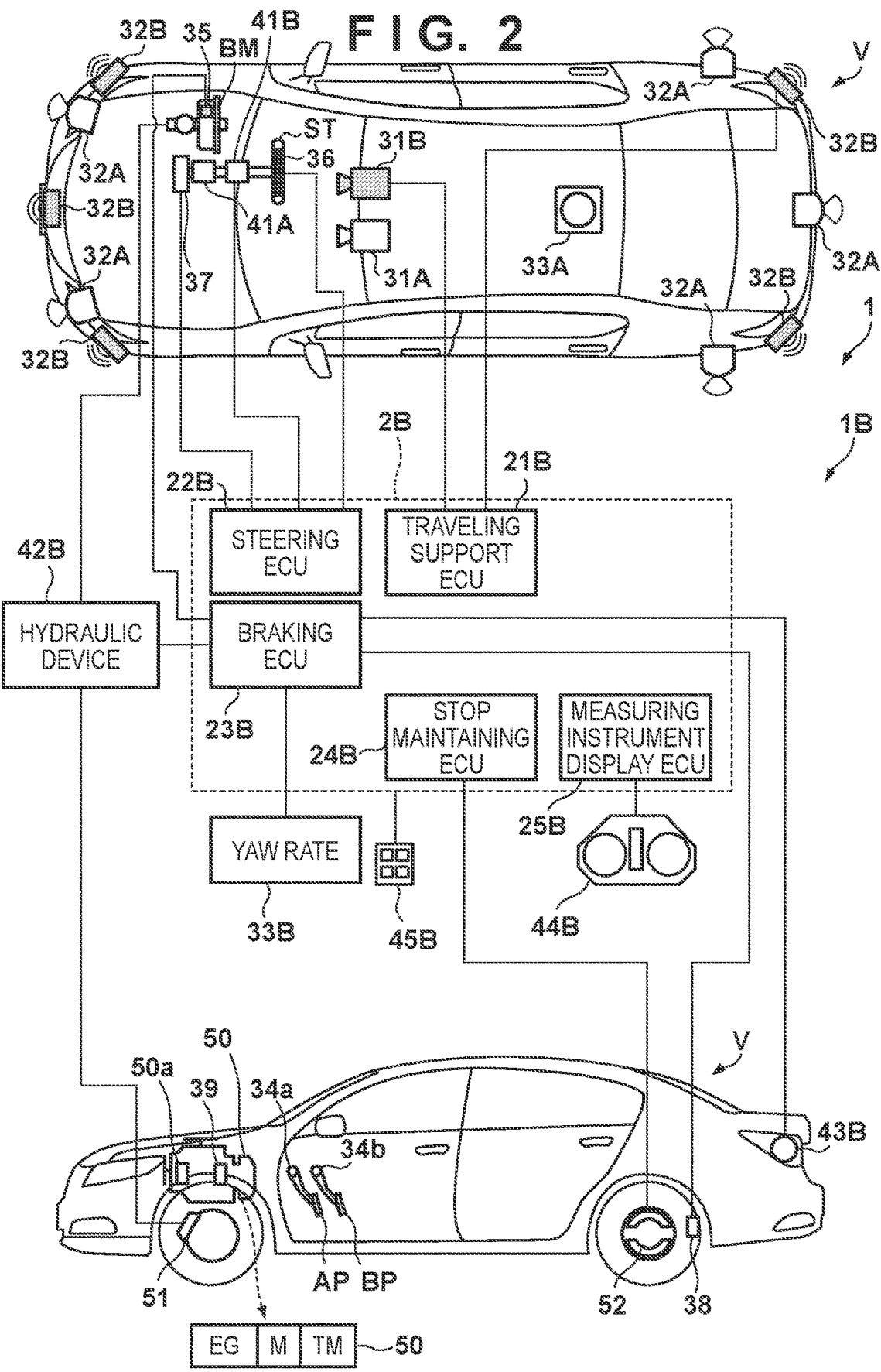
FIG. 2 is a block diagram of the vehicle control system according to the embodiment.

FIGS. 1 to 4 are block diagrams of a vehicle control system 1 according to an embodiment of the present invention. The control system 1 controls a vehicle V. In each of FIGS. 1 and 2, an outline of the vehicle V is shown in a plan view and a side view. As an example, the vehicle V is a sedan-type four-wheeled vehicle. The control system 1 includes a control apparatus 1A and a control apparatus 1B. FIG. 1 is a block diagram showing the control apparatus 1A, and FIG. 2 is a block diagram showing the control apparatus 1B. FIG. 3 mainly shows the arrangement of communication lines between the control apparatus 1A and the control apparatus 1B and power supplies.

The control apparatus 1A and the control apparatus 1B make some functions implemented by the vehicle V multiplexed or redundant. This can improve the reliability of the system. The control apparatus 1A performs, for example, not only automated driving control and normal operation control in manual driving but also traveling support control concerning emergency avoidance and the like. The control apparatus 1B mainly performs traveling support control concerning emergency avoidance and the like. Traveling support will sometimes be referred to as driving support. The control apparatus 1A and the control apparatus 1B are caused to perform different control processes while making the functions redundant, thereby improving the reliability while distributing the control processes.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M is usable as a driving source to accelerate the vehicle V and is also usable as a power generator upon deceleration or the like (regenerative braking).

<Control Apparatus 1A>

The arrangement of the control apparatus 1A will be described with reference to FIG. 1. The control apparatus 1A includes an ECU group (control unit group) 2A. The ECU group 2A includes a plurality of ECUs 20A to 29A. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 1 and 3, the names of the representative functions of the ECUs 20A to 29A are given. For example, the ECU 20A is denoted by "automated driving ECU".

The ECU 20A executes control associated with automated driving as traveling control of the vehicle V. In automated driving, at least one of driving (acceleration of the vehicle V by the power plant 50, and the like), steering, and braking of the vehicle V is automatically performed independently of the driving operation of the driver. In this embodiment, driving, steering, and braking are automatically performed.

The ECU 21A is an environment recognition unit configured to recognize the traveling environment of the vehicle V based on the detection results of detection units 31A and 32A that detect the peripheral situation of the vehicle V. The ECU 21A generates target data (to be described later) as peripheral environment information.

In this embodiment, the detection unit 31A is an image capturing device (to be sometimes referred to as the camera 31A hereinafter) configured to detect an object around the vehicle V by image capturing. The camera 31A is provided at the roof front of the vehicle V to capture the front side of the vehicle V. When images captured by the camera 31A are analyzed, the contour of a target or a division line (a white line or the like) of a lane on a road can be extracted.

In this embodiment, the detection unit 32A is a LiDAR (Light Detection and Ranging) (to be sometimes referred to as the LiDAR 32A hereinafter) configured to detect an object around the vehicle V by light, and detects a target around the vehicle V or measures the distance to a target. In this embodiment, five LiDARs 32A are provided; one at each corner of the front portion of the vehicle V, one at the center of the rear portion, and one on each side of the rear portion. The number of LiDARs 32A and their arrangement can appropriately be selected.

The ECU 29A is a traveling support unit configured to execute control associated with traveling support (in other words, driving support) as traveling control of the vehicle V based on the detection result of the detection unit 31A.

The ECU 22A is a steering control unit configured to control an electric power steering device 41A. The electric power steering device 41A includes a mechanism that steers the front wheels in accordance with the driving operation (steering operation) of the driver on a steering wheel ST. The electric power steering device 41A includes a motor that generates a driving force to assist the steering operation or automatically steer the front wheels, a sensor that detects the rotation amount of the motor, a torque sensor that detects the steering torque on the driver, and the like.

The ECU 23A is a braking control unit configured to control a hydraulic device 42A. The hydraulic device 42A implements, for example, an ESB (Electric Servo Brake). A braking operation of the driver on a brake pedal BP is converted into a fluid pressure by a brake master cylinder BM and transmitted to the hydraulic device 42A. The hydraulic device 42A is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23A performs driving control of a solenoid valve and the like provided in the hydraulic device 42A. In this embodiment, the ECU 23A and the hydraulic device 42A form an electric servo brake. The ECU 23A controls, for example, the distribution of a braking force by the four brake devices 51 and a braking force by regenerative braking of the motor M.

The ECU 24A is a stop maintaining control unit configured to control an electric parking lock device 50a provided in the automatic transmission TM. The electric parking lock device 50a includes a mechanism that mainly locks the internal mechanism of the automatic transmission TM when the P range (parking range) is selected. The ECU 24A can control lock and unlock by the electric parking lock device 50a.

The ECU 25A is an in-vehicle alarm control unit configured to control an information output device 43A that alarms information in the vehicle. The information output device 43A includes, for example, a display device such as a head-up display and a voice output device. The information output device 43A may further include a vibration device. The ECU 25A causes the information output device 43A to output, for example, various kinds of information such as a vehicle speed and an atmospheric temperature and information such as a path guidance.

The ECU 26A is an external alarm control unit configured to control an information output device 44A that alarms information outside the vehicle. In this embodiment, the information output device 44A is a direction indicator (hazard lamp). The ECU 26A controls blinking of the information output device 44A serving as a direction indicator, thereby alarming the exterior of the vehicle of the advancing direction of the vehicle V. In addition, the ECU 26A controls blinking of the information output device 44A serving as a hazard lamp, thereby increasing the attention of the exterior to the vehicle V.

The ECU 27A is a driving control unit configured to control the power plant 50. In this embodiment, one ECU 27A is assigned to the power plant 50. However, one ECU may be assigned to each of the internal combustion engine EG, the motor M, and the automatic transmission TM. The ECU 27A controls the output of the internal combustion engine EG or the motor M or switches the gear range of the automatic transmission TM in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the traveling state of the vehicle V, a rotation speed sensor 39 that detects the rotation speed of the output shaft of the automatic transmission TM is provided in the automatic transmission TM. The vehicle speed of the vehicle V can be calculated from the detection result of the rotation speed sensor 39.

The ECU 28A is a position recognition unit configured to recognize the current position or the route of the vehicle V. The ECU 28A performs control of a gyro sensor 33A, a GPS sensor 28b, and a communication device 28c and information processing of a detection result or a communication result. The gyro sensor 33A detects the rotary motion of the vehicle V. The route of the vehicle V can be determined based on the detection result of the gyro sensor 33A, and the like. The GPS sensor 28b detects the current position of the vehicle V. The communication device 28c performs wireless communication with a server configured to provide map information and traffic information, and acquires these pieces of information. A database 28a can store accurate map information. The ECU 28A can more accurately specify the position of the vehicle V on a lane based on the map information and the like.

An input device 45A is arranged in the vehicle such that the driver can operate it, and accepts input of an instruction or information from the driver.

<Control Apparatus 1B>

The arrangement of the control apparatus 1B will be described with reference to FIG. 2. The control apparatus 1B includes an ECU group (control unit group) 2B. The ECU group 2B includes a plurality of ECUs 21B to 25B. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 2 and 3, the names of the representative functions of the ECUs 21B to 25B are given, like the ECU group 2A.

The ECU 21B is an environment recognition unit configured to recognize the traveling environment connect of the vehicle V based on the detection results of detection units 31B and 32B that detect the peripheral situation of the vehicle V, and also serves as a traveling support unit configured to execute control associated with traveling support (in other words, driving support) as traveling control of the vehicle V. The ECU 21B generates target data (to be described later) as peripheral environment information.

Note that in this embodiment, the ECU 21B has the environment recognition function and the traveling support function. However, an ECU may be provided for each function, like the ECU 21A and the ECU 29A of the control apparatus 1A. Reversely, in the control apparatus 1A, the functions of the ECU 21A and the ECU 29A may be implemented be one ECU, like the ECU 21B.

In this embodiment, the detection unit 31B is an image capturing device (to be sometimes referred to as the camera 31B hereinafter) configured to detect an object around the vehicle V by image capturing. The camera 31B is provided at the roof front of the vehicle V to capture the front side of the vehicle V. When images captured by the camera 31B are analyzed, the contour of a target or a division line (a white line or the like) of a lane on a road can be extracted. In this embodiment, the detection unit 32B is a millimeter wave radar (to be sometimes referred to as the radar 32B hereinafter) configured to detect an object around the vehicle V by a radio wave, and detects a target around the vehicle V or measures the distance to a target. In this embodiment, five radars 32B are provided; one at the center of the front portion of the vehicle V, one at each corner of the front portion, and one at each corner of the rear portion. The number of radars 32B and their arrangement can appropriately be selected.

The ECU 22B is a steering control unit configured to control the electric power steering device 41B. The electric power steering device 41B includes a mechanism that steers the front wheels in accordance with the driving operation (steering operation) of the driver on the steering wheel ST. The electric power steering device 41B includes a motor that generates a driving force to assist the steering operation or automatically steer the front wheels, a sensor that detects the rotation amount of the motor, a torque sensor that detects the steering torque on the driver, and the like. In addition, a steering angle sensor 37 is electrically connected to the ECU 22B via a communication line L2 to be described later, and the electric power steering device 41B can be controlled based on the detection result of the steering angle sensor 37. The ECU 22B can acquire the detection result of a sensor 36 that detects whether the driver is gripping the steering handle ST, and can monitor the gripping state of the driver.

The ECU 23B is a braking control unit configured to control a hydraulic device 42B. The hydraulic device 42B implements, for example, VSA (Vehicle Stability Assist). A braking operation of the driver on the brake pedal BP is converted into a fluid pressure by the brake master cylinder BM and transmitted to the hydraulic device 42B. The hydraulic device 42B is an actuator capable of controlling, based on the fluid pressure transmitted from the brake master cylinder BM, the fluid pressure of hydraulic oil to be supplied to the brake device 51 of each wheel. The ECU 23B performs driving control of a solenoid valve and the like provided in the hydraulic device 42B.

In this embodiment, a wheel speed sensor 38 provided in each of the four wheels, a yaw rate sensor 33B, and a pressure sensor 35 configured to detect the pressure in the brake master cylinder BM are electrically connected to the ECU 23B and the hydraulic device 42B, and based on the detection results of these, an ABS function, traction control, and the posture control function for the vehicle V are implemented. For example, the ECU 23B adjusts the braking force of each wheel based on the detection result of the wheel speed sensor 38 provided in each of the four wheels, thereby suppressing skid of each wheel. In addition, the ECU 23B adjusts the braking force of each wheel based on the rotation angular speed about the vertical axis of the vehicle V detected by the yaw rate sensor 33B, thereby suppressing an abrupt posture change of the vehicle V.

The ECU 23B also functions as an external alarm control unit configured to control an information output device 43B that alarms information outside the vehicle. In this embodiment, the information output device 43B is a brake lamp, and the ECU 23B can light the brake lamp at the time of braking or the like. This can increase the attention of a following vehicle to the vehicle V.

The ECU 24B is a stop maintaining control unit configured to control an electric parking brake device (for example, a drum brake) 52 provided in each rear wheel. The electric parking brake device 52 includes a mechanism that locks the rear wheel. The ECU 24B can control lock and unlock of the rear wheels by the electric parking brake devices 52.

The ECU 25B is an in-vehicle alarm control unit configured to control an information output device 44B that alarms information in the vehicle. In this embodiment, the information output device 44B includes a display device arranged on the instrument panel. The ECU 25B can cause the information output device 44B to output various kinds of information such as a vehicle speed and fuel consumption.

An input device 45B is arranged in the vehicle such that the driver can operate it, and accepts input of an instruction or information from the driver.

<Communication Lines>

An example of communication lines of the control system 1, which communicably connect the ECUs, will be described with reference to FIG. 3. The control system 1 includes communication lines L1 to L7 of wired communication. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 connects the ECU 20A and the ECU 21B. The communication line L4 connects the ECU 20A and the ECU 21A. The communication line L5 connects the ECU 20A, the ECU 21A, and the ECU 28A. The communication line L6 connects the ECU 29A and the ECU 21A. The communication line L7 connects the ECU 29A and the ECU 20A.

The protocols of the communication lines L1 to L7 may be identical or different, and may be changed in accordance with the communication environment such as a communication speed, a communication amount, and durability. For example, the communication lines L3 and L4 may be Ethernet® from the viewpoint of communication speed. For example, the communication lines L1, L2, and L5 to L7 may be CAN.

The control apparatus 1A includes a gateway GW. The gateway GW relays the communication line L1 and the communication line L2. For this reason, for example, the ECU 21B can output a control instruction to the ECU 27A via the communication line L2, the gateway GW, and the communication line L1.

<Power Supply>

The power supply of the control system 1 will be described with reference to FIG. 3. The control system 1 includes a large capacity battery 6, a power supply 7A, and a power supply 7B. The large capacity battery 6 is a battery used to drive the motor M and charged by the motor M.

The power supply 7A is a power supply that supplies power to the control apparatus 1A, and includes a power supply circuit 71A and a battery 72A. The power supply circuit 71A is a circuit that supplies the power of the large capacity battery 6 to the control apparatus 1A, and, for example, lowers the output voltage (for example, 190 V) of the large capacity battery 6 to a reference voltage (for example, 12 V). The battery 72A is a lead battery of, for example, 12 V. Since the battery 72A is provided, the power can be supplied to the control apparatus 1A even in a case in which the power supply of the large capacity battery 6 or the power supply circuit 71A is shut down or lowers.

The power supply 7B is a power supply that supplies power to the control apparatus 1B, and includes a power supply circuit 71B and a battery 72B. The power supply circuit 71B is a circuit that is similar to the power supply circuit 71A and supplies the power of the large capacity battery 6 to the control apparatus 1B. The battery 72B is a battery similar to the battery 72A, and is a lead battery of, for example, 12 V. Since the battery 72B is provided, the power can be supplied to the control apparatus 1B even in a case in which the power supply of the large capacity battery 6 or the power supply circuit 71B is shut down or lowers.

<Overall Arrangement>

The overall arrangement of the vehicle V will be described from another viewpoint with reference to FIG. 4. The vehicle V includes the control apparatuses 1A and 1B, an external recognition apparatus group 82, and an actuator group 83.

The external recognition apparatus group 82 is a set of external recognition apparatuses (sensors) mounted on the vehicle V. The external recognition apparatus group 82 includes the above-described cameras 31A and 31B, LiDAR 32A, and radar 32B. The camera 31A and the LiDAR 32A are connected to the ECU 20A via the ECU 21A. Pieces of external information obtained by the camera 31A and the LiDAR 32A and diagnosis information concerning these devices are supplied to the ECU 20A, and the camera 31A and the LiDAR 32A operate in accordance with an instruction from the ECU 20A. The camera 31B and the radar 32B are connected to the ECU 21B. Pieces of external information obtained by the camera 31B and the radar 32B and diagnosis information concerning these devices are supplied to the ECU 21B, and the camera 31B and the radar 32B operate in accordance with an instruction from the ECU 21B. The ECU 21B may supply the pieces of external information obtained by the camera 31B and the radar 32B to the ECU 20A. This enables the ECU 20A to execute control of automated driving using the pieces of external information respectively obtained from the cameras 31A and 31B, LiDAR 32A, and radar 32B.

The actuator group 83 is a set of actuators mounted on the vehicle V. The actuator group 83 includes the above-described electric power steering devices 41A and 41B, hydraulic devices 42A and 42B, and power plant 50. The electric power steering device 41A, the hydraulic device 42A, and the power plant 50 are connected to the ECU 20A via the ECUs 22A, 23A, and 27A, respectively. Instead, the ECU 20A may be connected to only some of the electric power steering device 41A, the hydraulic device 42A, and the power plant 50. Pieces of diagnosis information concerning the electric power steering device 41A, the hydraulic device 42A, and the power plant 50 are supplied to the ECU 20A, and the electric power steering device 41A, the hydraulic device 42A, and the power plant 50 operate in accordance with an instruction from the ECU 20A. The electric power steering device 41B and the hydraulic device 42B are connected to the ECU 21B via the ECUs 22B and 23B, respectively. Instead, the ECU 21B may be connected to only one of the electric power steering device 41B and the hydraulic device 42B. Pieces of diagnosis information concerning the electric power steering device 41B and the hydraulic device 42B are supplied to the ECU 21B, and the electric power steering device 41B and the hydraulic device 42B operate in accordance with an instruction from the ECU 21B.

The power plant 50 drives the vehicle V, and is thus a kind of longitudinal control actuator. Furthermore, the power plant 50 can change the direction of the vehicle V by changing the distribution of the driving forces of the left and right wheels, and is thus a kind of lateral control actuator. Each of the hydraulic devices 42A and 42B performs braking of the vehicle V, and is thus a kind of longitudinal control actuator. Furthermore, each of the hydraulic devices 42A and 42B can change the direction of the vehicle V by brake torque vectoring, and is thus a kind of lateral control actuator. Each of the electric power steering devices 41A and 41B controls steering of the vehicle V. and is thus a kind of lateral control actuator.

The ECU 20A communicates with part (camera 31A and LiDAR 32A) of the external recognition apparatus group 82 through a communication path, and communicates with part (electric power steering device 41A, hydraulic device 42A, and power plant 50) of the actuator group 83 through another communication path. The ECU 21B communicates with part (camera 31B and radar 32B) of the external recognition apparatus group 82 through a communication path, and communicates with part (electric power steering device 41B and hydraulic device 42B) of the actuator group 83 through another communication path. The communication path connected to the ECU 20A may be different from that connected to the ECU 21B. These communication paths use, for example, CAN (Controller Area Network) but may use Ethernet®. The ECUs 20A and 21B are interconnected via a communication path. This communication path uses, for example, CAN (Control Area Network) but may use Ethernet®. Alternatively, the ECUs 20A and 21B may be interconnected by both CAN and Ethernet®.

The ECU 20A includes a high performance processing apparatus 80A and a high reliability processing apparatus 81A. Each of the high performance processing apparatus 80A and the high reliability processing apparatus 81A is formed by a processor such as a CPU and a memory such as a RAM. The processing performance of the high performance processing apparatus 80A is higher than the processing performance of the high reliability processing apparatus 81A. The performance of a processing apparatus is compared by, for example, the number of clocks or a benchmark test result. The reliability of the high reliability processing apparatus 81A is higher than the reliability of the high performance processing apparatus 80A. For example, in the evaluation standard of the failure occurrence rate of a processing apparatus, the high reliability processing apparatus 81A has a reliability higher than that of the high performance processing apparatus 80A.

The high performance processing apparatus 80A receives an input (for example, external information or diagnosis information) from the external recognition apparatus group 82, generates, based on the input, a track that the vehicle V should take during automated driving, and supplies the track to the high reliability processing apparatus 81A. The high reliability processing apparatus 81A decides the operation amount of each actuator to implement the track, generates instructions to the actuator group 83, and supplies the instructions to the ECUs that control the actuators.

The high reliability processing apparatus 81A also functions as a monitoring unit that monitors the communication situation of the communication path to the external recognition apparatus group 82 and the communication situation of the communication path to the actuator group 83. The communication situation includes a result of self-diagnosis of the apparatus of the connection destination and a situation in which communication with the apparatus of the connection destination is impossible. The high reliability processing apparatus 81A can detect function lowering concerning the vehicle V based on these communication situations. That is, the high reliability processing apparatus 81A can detect function lowering concerning the actuators and the external recognition apparatuses connected to the ECU 20A. The high reliability processing apparatus 81A may also monitor the communication situation between the ECU 21B and the external recognition apparatuses connected to the ECU 21B. In this case, the high reliability processing apparatus 81A can detect function lowering concerning the external recognition apparatuses connected to the ECU 21B.

The high reliability processing apparatus 81A also functions as a control unit that performs alternative control during automated driving. Alternative control means control performed when it is determined that switching from automated driving to manual driving is necessary, and is control that substitutes control of normal automated driving. In this alternative control, the high reliability processing apparatus 81A controls traveling of the vehicle V using the actuators (the electric power steering device 41A, the hydraulic device 42A, and the power plant 50) connected to itself. More specifically, the high reliability processing apparatus 81A makes a notification to the driver of the vehicle V to request switching to manual driving while maintaining automated driving traveling. If a response to the notification is not returned for a predetermined time (for example, 4 sec or 15 sec), the high reliability processing apparatus 81A searches for a position at which the vehicle V can be stopped while decelerating the vehicle V. If the position where stop is possible can be found, the high reliability processing apparatus 81A stops the vehicle V there. If the position where stop is possible cannot be found, the high reliability processing apparatus 81A searches for the position where stop is possible while making the vehicle V travel at a very low speed (for example, a creep speed). After that, the high reliability processing apparatus 81A determines the stop of the vehicle V based on the detection result of the rotation speed sensor 39, and upon determining that the vehicle V has stopped, maintains the stop of the vehicle V.

The ECU 21B includes a high performance processing apparatus 80B and a high reliability processing apparatus 81B, like the ECU 20A. The processing performance of the high performance processing apparatus 80B is higher than the processing performance of the high reliability processing apparatus 81B. The reliability of the high reliability processing apparatus 81B is higher than the reliability of the high performance processing apparatus 80B. The high reliability processing apparatus 81B satisfies, for example, ASIL D, and the high performance processing apparatus 80B satisfies, for example, ASIL B.

The high performance processing apparatus 80B receives an input (for example, external information or diagnosis information) from the external recognition apparatus group 82, decides, based on the input, the support contents of traveling of the vehicle V during manual driving, and supplies the contents to the high reliability processing apparatus 81B. The high reliability processing apparatus 81B decides the operation amount of each actuator to implement the support, generates instructions to the actuator group 83, and supplies the instructions to the ECUs that control the actuators.

The high reliability processing apparatus 81B also functions as a monitoring unit that monitors the communication situation of the communication path to the external recognition apparatus group 82 and the communication situation of the communication path to the actuator group 83. The high reliability processing apparatus 81B can detect function lowering concerning the vehicle V based on these communication situations. That is, the high reliability processing apparatus 81B can detect function lowering concerning the actuators and the external recognition apparatuses connected to the ECU 21B.

The high reliability processing apparatus 81B also functions as a control unit that performs alternative control during automated driving. In this alternative control, the high reliability processing apparatus 81B controls traveling of the vehicle V using the actuators (the electric power steering device 41B and the hydraulic device 42B) connected to itself. Thus, in this embodiment, both the high reliability processing apparatus 81A of the ECU 20A and the high reliability processing apparatus 81B of the ECU 21B function as a monitoring unit and a control unit that performs alternative control. Hence, high redundancy is implemented.

<Functional Arrangement of Vehicle Control Apparatus>

Figure 5B:
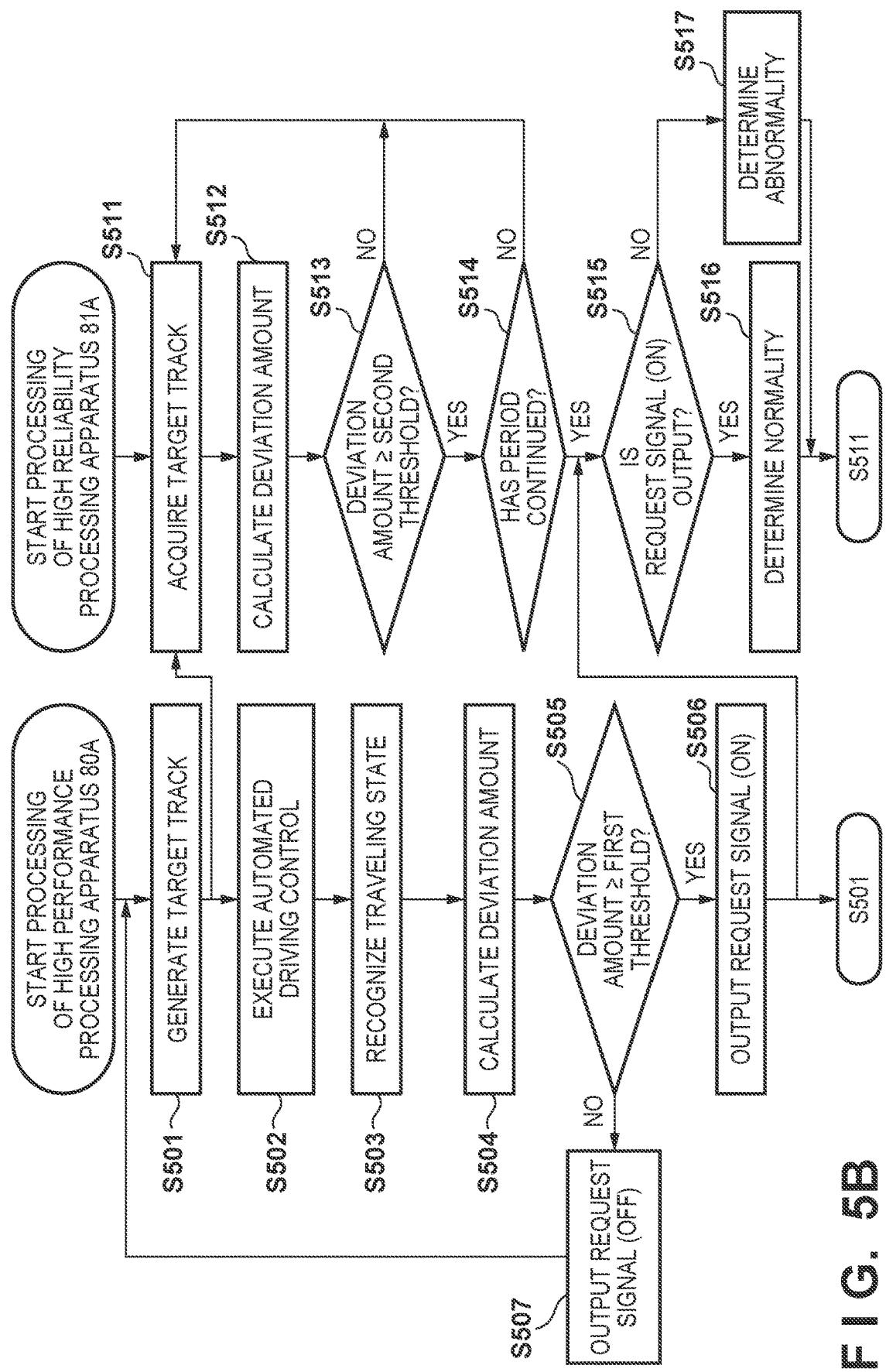
FIG. 5B is a flowchart showing the procedure of processing of the vehicle control apparatus according to the embodiment.

FIG. 5A is a block diagram showing the functional arrangement of the vehicle control apparatus (automated driving ECU: ECU 20A) according to the embodiment. The ECU 20A can execute control associated with automated driving as traveling control of the vehicle V. The ECU 20A includes the high performance processing apparatus 80A and the high reliability processing apparatus 81A. FIG. 5B is a flowchart for explaining the procedure of processing of the high performance processing apparatus 80A and the high reliability processing apparatus 81A.

The high performance processing apparatus 80A includes, as functional components, a track generation unit 510, an automated driving control unit 511, a recognition unit 512, and a path deviation determination unit 513. The high performance processing apparatus 80A includes, as an internal memory, a first storage unit 514 (first storage medium) that is, for example, a volatile memory such as a RAM.

The high reliability processing apparatus 81A includes an operation monitoring unit 520 as a functional component, and further includes, as an internal memory, a second storage unit 521 (second storage medium) that is, for example, a volatile memory such as a RAM.

Note that in the arrangement shown in FIG. 5A, a plurality of storage media (the first storage unit 514 and the second storage unit 521) are provided in the ECU 20A. However, the arrangement is not limited to this example. A single storage unit may be arranged in the ECU 20A, and when the high performance processing apparatus 80A and the high reliability processing apparatus 81A perform processing, data need by each apparatus may be acquired from the single storage unit. In this case, in addition to the reliability of the storage unit, arithmetic processing of the high reliability processing apparatus 81A needs to ensure a reliability higher than the high performance processing apparatus 80A. For example, as for the arrangement of the high reliability processing apparatus 81A, an anti-vibration structure may be formed to reduce the influence of vibrations, or the high reliability processing apparatus 81A may be arranged at a position to increase the heat dissipation efficiency.

As for the arrangement example of the storage units, the high performance processing apparatus 80A, and the high reliability processing apparatus 81A, the high performance processing apparatus 80A and the high reliability processing apparatus 81A may be divided into a plurality of ECUs, and a storage unit may be provided for each ECU.

The first storage unit 514 and the second storage unit 521 store information representing the traveling state of the vehicle V, which is acquired based on the detection results of the detection units (for example, the camera 31A, the LiDAR 32A, the gyro sensor 33A, the GPS sensor 28b, and the like).

Here, the information representing the traveling state of the vehicle V includes, for example, the position information (traveling track) of the vehicle V, the information of the steering angle, the rotation angle (yaw angle) of the vehicle V about a vertical axis, the rotation angular speed (yaw rate), and the like. Pieces of information input from the environment recognition ECU 21A and the position recognition ECU 28A to the first storage unit 514 and the second storage unit 521 are pieces of information that constitute the information representing the traveling state of the vehicle V. The pieces of information stored in the first storage unit 514 and the second storage unit 521 are identical.

Referring to FIG. 5A, the environment recognition ECU 21A is connected to the camera 31A and the LiDAR 32A shown in FIG. 4, and pieces of external information obtained by the camera 31A and the LiDAR 32A are input to the environment recognition ECU 21A. The environment recognition ECU 21A is an environment recognition unit that recognizes the traveling environment of the vehicle V, generates peripheral environment information (target data) such as the position of the vehicle V (self-vehicle) in a lane, the contour of a target existing around the vehicle V, the distance between the target and the vehicle V, and the division line (white line or the like) of a lane on a road, and stores the generated peripheral environment information (target data) in the first storage unit 514 and the second storage unit 521.

The position recognition ECU 28A is a position recognition unit that recognizes the current position and the route of the vehicle V and performs control of the gyro sensor 33A, the GPS sensor 28b, and the communication device 28c and information processing of a detection result or a communication result. The position recognition ECU 28A stores the information of the route of the vehicle V acquired from the detection result of the gyro sensor 33A, and the like, the information of the current position of the vehicle V acquired from the GPS sensor 28b, and the like in the first storage unit 514 and the second storage unit 521.

The track generation unit 510 generates a target track of the vehicle V based on the information of traveling conditions and a destination set by the user (step S501 of FIG. 5B). Based on the target track generated by the track generation unit 510, the automated driving control unit 511 performs automated driving control of automatically controlling steering of the vehicle V (step S502 of FIG. 5B).

The recognition unit 512 recognizes the traveling state of the vehicle that travels based on automated driving control by the automated driving control unit 511 (step S503 of FIG. 5B). Based on the recognition result, the recognition unit 512 calculates the deviation amount of the information (for example, the position information (traveling track) of the vehicle V, the information of the steering angle, the rotation angle (yaw angle) of the vehicle V about a vertical axis, and the rotation angular speed (yaw rate)) representing the traveling state of the vehicle V with respect to the target track (step S504 of FIG. 5B).

Based on the recognition result of the recognition unit 512, if the deviation amount of the information representing the traveling state with respect to the target track is equal to or more than a first threshold (YES in step S505), the path deviation determination unit 513 outputs a request signal (ON) 515 for requesting driving takeover (step S506 of FIG. 5B: output step). The path deviation determination unit 513 inputs the output of the request signal (ON) 515 to step S515 of processing on the side of the operation monitoring unit 520 of the high reliability processing apparatus 81A. The path deviation determination unit 513 returns the process to step S501, and repetitively executes the same processing.

On the other hand, in the determination of step S505, if the deviation amount of the information representing the traveling state with respect to the target track is less than the first threshold (NO in step S505), the deviation amount falls within an allowable range, and the path deviation determination unit 513 determines that driving takeover is unnecessary. In this case, the path deviation determination unit 513 does not output the request signal (ON) for requesting driving takeover (request signal (OFF): step S507 of FIG. 5B). The path deviation determination unit 513 returns the process to step S501, and repetitively executes the same processing.

The track generation unit 510, the automated driving control unit 511, the recognition unit 512, and the path deviation determination unit 513, which are the functional components of the high performance processing apparatus 80A, access the first storage unit 514 at a first access frequency (first clock), and execute processing based on the information representing the traveling state, which is stored in the first storage unit 514.

In the high performance processing apparatus 80A, the plurality of processing units (the track generation unit 510, the automated driving control unit 511, the recognition unit 512, and the path deviation determination unit 513) each access the first storage unit 514 at the first access frequency (first clock), thereby executing a multi-task in a shorter time.

In addition, the operation monitoring unit 520 that is the functional component of the high reliability processing apparatus 81A monitors the processing of the path deviation determination unit 513.

In step S511 of FIG. 5B, the operation monitoring unit 520 acquires the target track of the vehicle V generated by the track generation unit 510 in step S501.

In step S512, the operation monitoring unit 520 accesses the second storage unit 521 at a second access frequency lower than the first access frequency, and acquires the information representing the traveling state of the vehicle V (for example, the position information (traveling track) of the vehicle V, the information of the steering angle, the rotation angle (yaw angle) of the vehicle V about a vertical axis, the rotation angular speed (yaw rate), and the like) from the second storage unit. The operation monitoring unit 520 then calculates the deviation amount of the information representing the traveling state with respect to the target track, which is calculated using the target track and the information representing the traveling state of the vehicle. The operation monitoring unit 520 monitors the processing of the path deviation determination unit 513 by each process of the monitoring step of steps S513 to S517 below.

In step S513, the operation monitoring unit 520 compares the deviation amount calculated by the internal operation with a second threshold (>first threshold). If the deviation amount is less than the second threshold (NO in step S513), the operation monitoring unit 520 returns the process to step S511, and executes the same processing.

On the other hand, in the determination of step S513, if the deviation amount is equal to or more than the second threshold (YES in step S513), the operation monitoring unit 520 advances the process to step S514.

In step S514, the operation monitoring unit 520 determines whether the state in which the deviation amount is equal to or more than the second threshold has continued for a predetermined period. If the state in which the deviation amount is equal to or more than the second threshold has not continued for a predetermined period (NO in step S514), the operation monitoring unit 520 returns the process to step S51, and executes the same processing. Here, detailed contents of the continuous period determination processing will be described with reference to FIGS. 7 and 8.

On the other hand, in the determination of step S514, if the state in which the deviation amount is equal to or more than the second threshold has continued for a predetermined period (YES in step S514), the operation monitoring unit 520 advances the process to step S515.

In step S515, the operation monitoring unit 520 determines whether the request signal (ON) 515 for requesting driving takeover is output from the path deviation determination unit 513. If the request signal (ON) 515 is not output (NO in step S515), the operation monitoring unit 520 determines that an abnormality has occurred in the path deviation determination unit 513 (abnormality determination: step S517).

That is, if the deviation amount of the information representing the traveling state with respect to the target track, which is calculated using the target track and the information representing the traveling state of the vehicle V, is equal to or more than the second threshold larger than the first threshold (YES in step S513), and the state in which the request signal is not output continues for a predetermined period (YES in step S514 and NO in step S515), the operation monitoring unit 520 determines that an abnormality has occurred in the path deviation determination unit 513 (step S517).

Upon determining that an abnormality has occurred in the path deviation determination unit 513, the operation monitoring unit 520 sets an abnormality flag capable of identifying an abnormal state, and suppresses automated driving control by the automated driving control unit 511. Upon determining that an abnormality has occurred in the path deviation determination unit 513, the operation monitoring unit 520 inhibits reactivation of automated driving control by the automated driving control unit 511 after the end of the automated driving control of the vehicle V. In this case, the operation monitoring unit 520 maintains the state of reactivation inhibition of the automated driving control by the automated driving control unit 511 until the operation of the path deviation determination unit 513 returns to normal by maintenance of a dealer or the like. When the operation of the path deviation determination unit 513 returns to normal by maintenance of the dealer or the like, the setting of the abnormality flag is canceled, and the operation monitoring unit 520 cancels suppression of automated driving control by the automated driving control unit 511 and permits reactivation of automated driving control.

On the other hand, in the determination of step S515, if the request signal (ON) is output from the path deviation determination unit 513 (YES in step S515), the operation monitoring unit 520 determines that the operation of the path deviation determination unit 513 is normal (normality determination: step S516). The operation monitoring unit 520 returns the process to step S511, and repetitively executes the same processing. The operation monitoring unit 520 outputs a determination signal 522 (a signal representing normality determination or a signal representing abnormality determination) representing the determination result of step S515.

The operation monitoring unit 520 calculates the deviation amount of the information representing the traveling state with respect to the target track using the information representing the traveling state, which is acquired of the second storage unit 521 by accessing the second storage unit 521 at the second access frequency (second clock) lower than the first access frequency, and the target track generated by the track generation unit 510, and monitors the processing of the path deviation determination unit 513 based on the calculated deviation amount.

If a value stored in the RAM changes due to a memory error called a RAM transfer error, in the high performance processing apparatus 80A that executes a multi-task, a case in which the output of the path deviation determination unit 513 or the like becomes abnormal, and an abnormal state in which a request signal for requesting driving takeover is not output notwithstanding a deviation from a target track continues may occur.

In the operation monitoring unit 520 of the high reliability processing apparatus 81A, the contents of processing are limited as compared to processing of the high performance processing apparatus 80A (the track generation unit 510, the automated driving control unit 511, the recognition unit 512, and the path deviation determination unit 513), and the operation monitoring unit 520 is specialized to processing of monitoring the path deviation determination unit 513. When the operation monitoring unit 520 accesses the second storage unit 521 at the second access frequency (second clock) lower than the first access frequency, more reliable processing in which a memory error such as a RAM transfer error is suppressed can be implemented, as compared to the processing of the path deviation determination unit 513 and the like, which access the first storage unit 514 at the first access frequency (first clock) in the high performance processing apparatus 80A.

(Outline of Operation)

Figure 6:
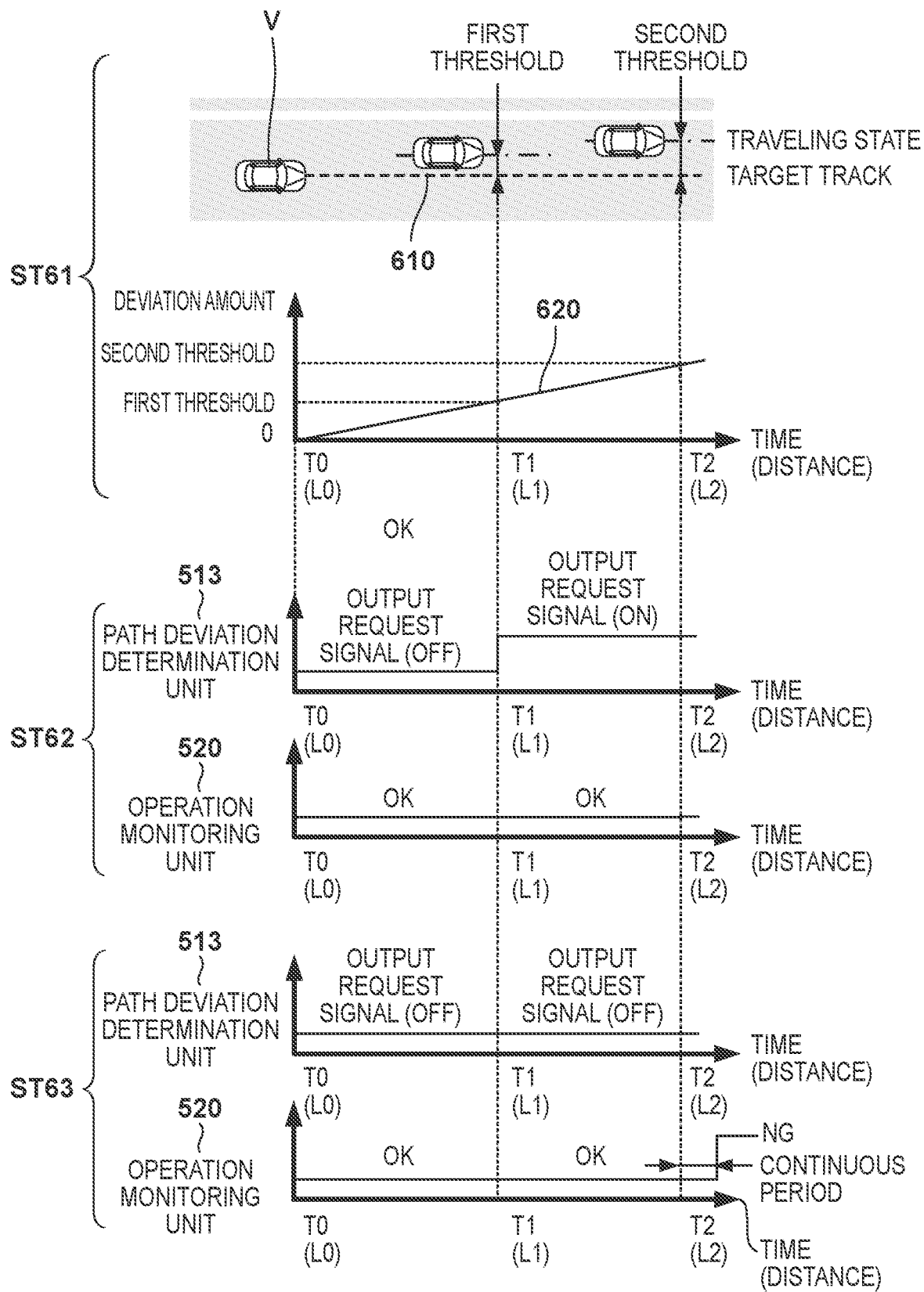
FIG. 6 is a view for explaining the outline of the operations of a path deviation determination unit and an operation monitoring unit.

FIG. 6 is a view for explaining the outline of the operations of the path deviation determination unit 513 and the operation monitoring unit 520. ST61 is a view for explaining the deviation amount of a traveling state 620 of the vehicle V (self-vehicle) with respect to a target track 610. The target track 610 is the above-described target track of the vehicle V generated by the track generation unit 510 based on the information of traveling conditions and a destination set by the user. The traveling state 620 is acquired based on the traveling state of the vehicle V recognized by processing of the recognition unit 512. The recognition unit 512 acquires the deviation amount of the information (for example, the position information (traveling track) of the vehicle V, the steering angle, the rotation angle (yaw angle) of the vehicle V about a vertical axis, and the like) representing the traveling state 620 of the vehicle V with respect to the target track 610.

In ST61, the position of the vehicle V (self-vehicle) at time T0 (or a distance L0) is defined as the origin, and after the elapse of a predetermined time or after traveling by a predetermined distance from the origin, the deviation amount at a time T1 (distance L1) is the first threshold.

In addition, after the elapse of a predetermined time or after traveling by a predetermined distance from the time T1 (distance L1), the deviation amount at a time T2 (distance L2) is the second threshold. Note that in ST61, a change in the traveling state 620 is exemplarily indicated by a straight line. However, the expression is not limited to this example, and can arbitrarily be changed in accordance with the traveling state of the vehicle V.

ST62 is a view schematically showing processing performed in a case in which the path deviation determination unit 513 normally operates. Based on the recognition result of the recognition unit 512, if the deviation amount of the information representing the traveling state 620 with respect to the target track 610 is less than the first threshold, the path deviation determination unit 513 determines that driving takeover is unnecessary. In this case, the path deviation determination unit 513 does not output the request signal (ON) for requesting driving takeover (request signal (OFF)).

Based on the recognition result of the recognition unit 512, if the deviation amount of the information representing the traveling state 620 with respect to the target track 610 is equal to or more than the first threshold, the path deviation determination unit 513 outputs the request signal (ON) for requesting driving takeover.

If the deviation amount calculated by the internal operation is less than the first threshold, the operation monitoring unit 520 determines that the deviation amount falls within the allowable range, and the processing of the path deviation determination unit 513 that does not output the request signal (ON) for requesting driving takeover is normal, and outputs a signal (OK) representing normality determination.

If the deviation amount calculated by the internal operation is equal to or more than the first threshold, the operation monitoring unit 520 determines that the processing of the path deviation determination unit 513 that outputs the request signal (ON) is normal, and outputs the signal (OK) representing normality determination.

Note that for easier understanding of the description, ST62 shows an example in which the request signal (ON) is output at the same timing as the time T1 (distance L1). However, the timing is not limited to this example. For example, as shown in ST71 of FIG. 7, the request signal (ON) for requesting driving takeover may be output when the deviation amount reaches the first threshold, and then, a state in which the deviation amount is equal to or more than the first threshold continues (after the elapse of a first period).

Figure 7:
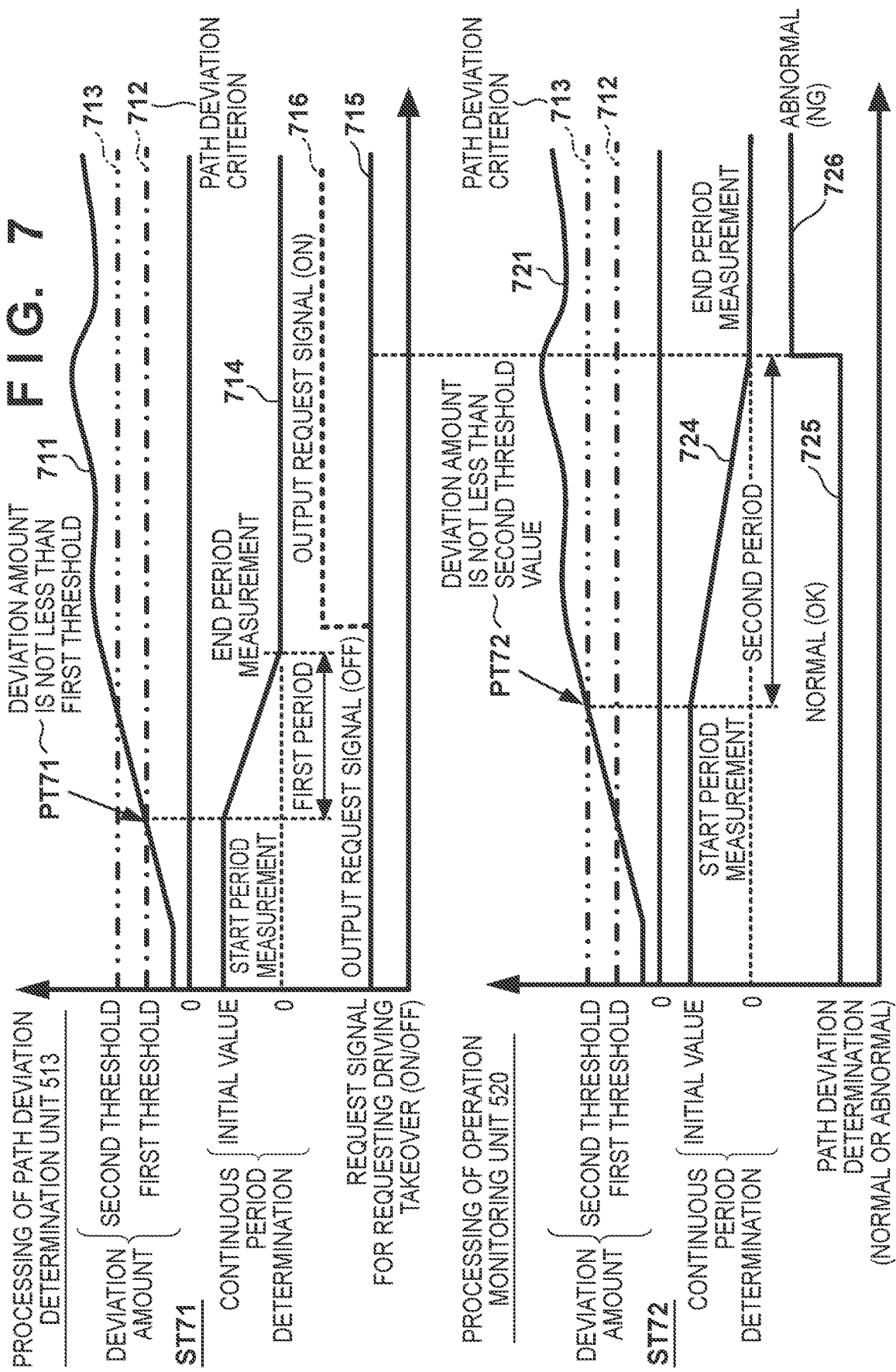
FIG. 7 is a view for explaining the operations of the path deviation determination unit and the operation monitoring unit.

For example, when continuous period determination is performed as shown in ST71 of FIG. 7, if output of the request signal (ON) is unnecessary, for example, if the deviation amount temporarily exceeds the first threshold because of the influence of a cross wind on the vehicle V or traveling at a corner, output of the request signal can be suppressed.

ST63 of FIG. 6 is a view schematically showing processing performed in a case in which the path deviation determination unit 513 does not normally operate. Based on the recognition result of the recognition unit 512, if the deviation amount of the information representing the traveling state 620 with respect to the target track 610 is less than the first threshold, the path deviation determination unit 513 determines that driving takeover is unnecessary. In this case, the path deviation determination unit 513 does not output the request signal (ON) for requesting driving takeover (request signal (OFF)).

Based on the recognition result of the recognition unit 512, if the deviation amount of the information representing the traveling state 620 with respect to the target track 610 is equal to or more than the first threshold, the path deviation determination unit 513 does not output the request signal (ON) for requesting driving takeover, and maintains the state in which the request signal (ON) is not output (request signal (OFF)).

If the deviation amount calculated by the internal operation is less than the first threshold, the operation monitoring unit 520 determines that the deviation amount falls within the allowable range, and the processing of the path deviation determination unit 513 that does not output the request signal (ON) for requesting driving takeover is normal, and outputs the signal (OK) representing normality determination.

If the deviation amount calculated by the internal operation is equal to or more than the first threshold and less than the second threshold, the operation monitoring unit 520 determines that the deviation amount falls within the allowable range, and the processing of the path deviation determination unit 513 that does not output the request signal (ON) for requesting driving takeover is normal, and maintains the output of the signal (OK) representing normality determination.

If the deviation amount calculated by the internal operation is equal to or more than the second threshold, and the state in which the request signal is not output continues for a predetermined period, the operation monitoring unit 520 determines that an abnormality has occurred in the path deviation determination unit 513 (abnormality determination), and outputs a signal (abnormality (NG)) representing abnormality determination.

(Operations of Path Deviation Determination Unit 513 and Operation Monitoring Unit 520)

The operations of the path deviation determination unit 513 and the operation monitoring unit 520 will be described next in detail with reference to FIG. 7. In FIG. 7, ST71 is a view for explaining the operation of the path deviation determination unit 513, and ST72 is a view for explaining the operation of the operation monitoring unit 520.

(Description of ST71 of FIG. 7)

A waveform 711 in ST71 represents a change in the deviation amount of the information (for example, the position information (traveling track) of the vehicle V, the steering angle, the rotation angle (yaw angle) of the vehicle V about a vertical axis, the rotation angular speed (yaw rate), and the like) representing the traveling state of the vehicle V with respect to the target track, which is acquired by the recognition unit 512.

An alternate long and short dashed line indicates a first threshold 712, and an alternate long and two short dashed line indicates a second threshold 713. In the processing of the path deviation determination unit 513, the first threshold 712 is the path deviation criterion. The second threshold 713 is the path deviation criterion in the operation monitoring unit 520.

In a case in which the deviation amount temporarily exceeds the first threshold, the path deviation determination unit 513 performs continuous period determination processing to suppress the output of the request signal. Here, the continuous period includes both continuation of time and continuation of the traveling distance.

The path deviation determination unit 513 incorporates a timer, and can activate the timer at the timing of measurement start and measure time. The path deviation determination unit 513 can also measure the traveling distance by integrating the position information of the vehicle V acquired from the first storage unit 514 at the timing of measurement start.

In ST71, PT71 is a point at which the deviation amount 711 becomes equal to or more than the first threshold 712, and the path deviation determination unit 513 starts period measurement at the timing PT71.

When measuring time, for example, an initial time (initial value) is set in the timer as a reference time for continuous period determination. The timer starts counting down the initial time (initial value) at the timing of period measurement start, and ends the period measurement when the initial time (initial value) has become zero. Based on the end of period measurement by the timer, the path deviation determination unit 513 determines that a state in which the deviation amount 711 is equal to or more than the first threshold 712 has continued for a predetermined period (the first period in ST71).

On the other hand, when measuring the traveling distance, for example, an initial traveling distance (initial value) is set in a distance counter in the path deviation determination unit 513 as a reference traveling distance for continuous period determination. The distance counter starts counting down the initial traveling distance (initial value) at the timing of period measurement start, and ends the period measurement when the initial traveling distance (initial value) has become zero. Based on the end of period measurement by the distance counter, the path deviation determination unit 513 determines that a state in which the deviation amount 711 is equal to or more than the first threshold 712 has continued for a predetermined period (the first period in ST71).

If the deviation amount 711 of the information representing the traveling state (for example, 620 in FIG. 6) with respect to the target track (for example, 610 in FIG. 6) is less than the first threshold, the path deviation determination unit 513 determines that driving takeover is unnecessary. In this case, the path deviation determination unit 513 does not output the request signal (ON) requesting driving takeover (request signal (OFF)) 715).

In ST71, a signal waveform indicated by a broken line represents a request signal (ON) 716 that is output if the path deviation determination unit 513 normally functions. If the path deviation determination unit 513 normally functions, the request signal (ON) should be output after the state in which the deviation amount 711 is equal to or more than the first threshold continues for a predetermined period (first period). In ST71, however, the request signal (ON) 716 is not output, and the path deviation determination unit 513 maintains the state in which the request signal (ON) is not output (request signal (OFF) 715).

(Description of ST72 of FIG. 7)

A waveform 721 in ST72 represents a change in the deviation amount calculated by the operation monitoring unit 520 by an internal operation.

An alternate long and short dashed line indicates the first threshold 712, and an alternate long and two short dashed line indicates the second threshold 713. The first threshold 712 and the second threshold 713 are common to the thresholds described concerning the path deviation determination unit 513. The second threshold 713 is the path deviation criterion in the operation monitoring unit 520.

In a case in which a deviation amount 721 temporarily exceeds the second threshold 713, the operation monitoring unit 520 performs continuous period determination processing to suppress determining that processing of the path deviation determination unit 513 is not normal (abnormality determination) (output of the signal (NG) representing abnormality determination). Here, the continuous period includes both continuation of time and continuation of the traveling distance.

The operation monitoring unit 520 incorporates a timer, and can activate the timer at the timing of measurement start and measure time. The operation monitoring unit 520 can also measure the traveling distance by integrating the position information of the vehicle V acquired from the second storage unit 521 at the timing of measurement start.

In ST72, PT72 is a point at which the deviation amount 721 becomes equal to or more than the second threshold 713, and the operation monitoring unit 520 starts period measurement at the timing PT72.

When measuring time, for example, an initial time (initial value) is set in the timer as a reference time for continuous period determination. The timer starts counting down the initial time (initial value) at the timing of period measurement start, and ends the period measurement when the initial time (initial value) has become zero. Based on the end of period measurement by the timer, the operation monitoring unit 520 determines that a state in which the deviation amount 721 is equal to or more than the second threshold 713 has continued for a predetermined period (a second period in ST72).

On the other hand, when measuring the traveling distance, for example, an initial traveling distance (initial value) is set in a distance counter in the operation monitoring unit 520 as a reference traveling distance for continuous period determination. The distance counter starts counting down the initial traveling distance (initial value) at the timing of period measurement start, and ends the period measurement when the initial traveling distance (initial value) has become zero. Based on the end of period measurement by the distance counter, the operation monitoring unit 520 determines that a state in which the deviation amount 721 is equal to or more than the second threshold 713 has continued for a predetermined period (the second period in ST72).

If the deviation amount 721 calculated by the internal operation is less than the first threshold, the operation monitoring unit 520 determines that the deviation amount falls within the allowable range, and the processing of the path deviation determination unit 513 that does not output the request signal (ON) for requesting driving takeover is normal, and outputs a signal (normal (OK) 725) representing normality determination.

If the deviation amount 721 calculated by the internal operation is equal to or more than the first threshold 712 and less than the second threshold 713, the operation monitoring unit 520 determines that the deviation amount 721 falls within the allowable range, and the processing of the path deviation determination unit 513 that does not output the request signal (ON) for requesting driving takeover is normal, and maintains the output of the signal (normal (OK) 725) representing normality determination.

If the deviation amount 721 calculated by the internal operation is equal to or more than the second threshold 713, and the state in which the request signal is not output continues for a predetermined period (the second period in ST72), the operation monitoring unit 520 determines that an abnormality has occurred in the path deviation determination unit 513 (abnormality determination), and outputs a signal (abnormal (NG) 726) representing abnormality determination.

(Example of Operation of Operation Monitoring Unit 520)

Figure 8:
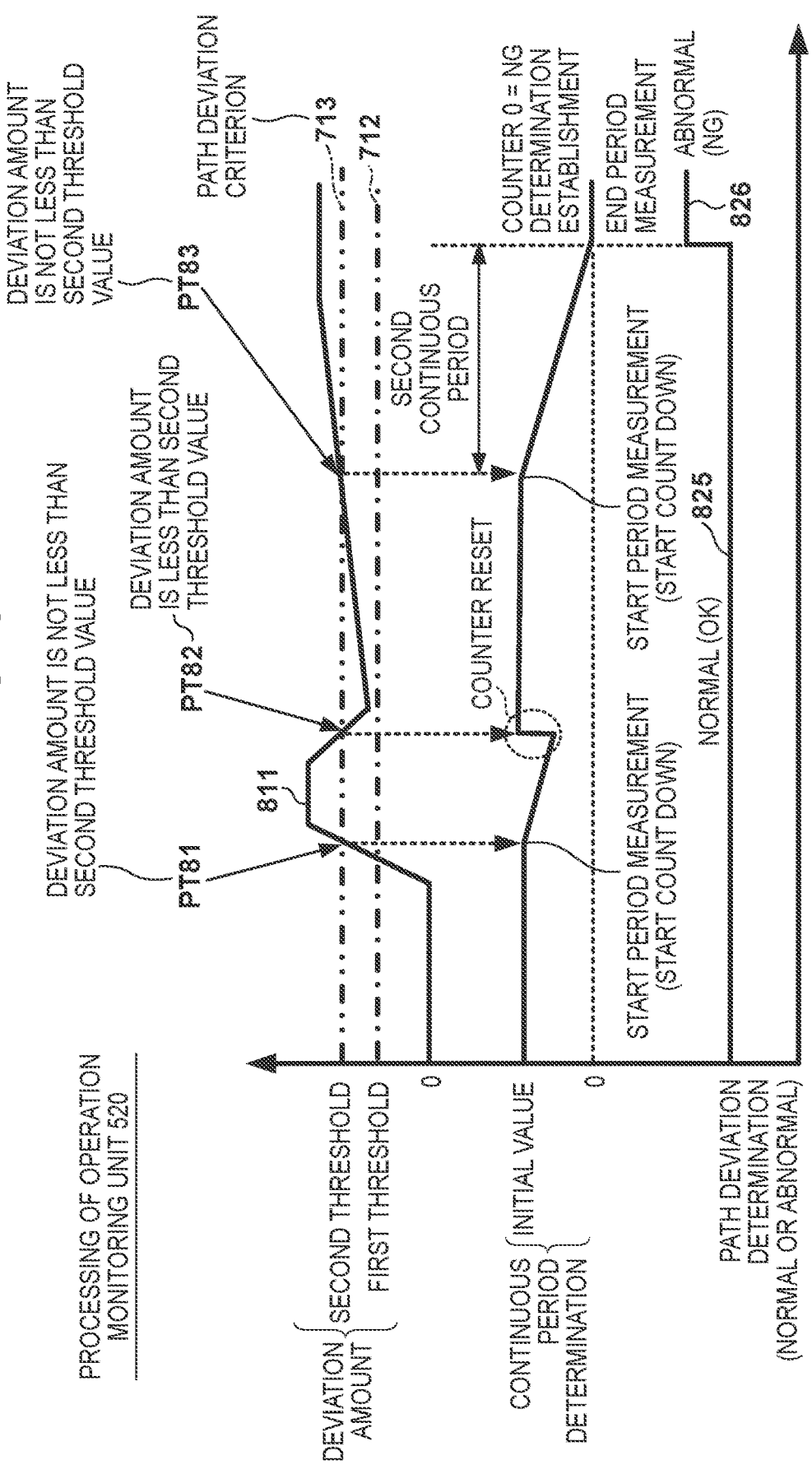
FIG. 8 is a view for explaining an example of the operation of the operation monitoring unit.

FIG. 8 is a view for explaining an example of the operation of the operation monitoring unit 520. A waveform 811 represents a change in the deviation amount calculated by the internal operation of the operation monitoring unit 520. As described with reference to FIG. 7, an alternate long and short dashed line indicates the first threshold 712, and the alternate long and two short dashed line indicates the second threshold 713. The second threshold 713 is the path deviation criterion in the operation monitoring unit 520.

Continuous period determination processing executed by the operation monitoring unit 520 is the same as the processing described with reference to FIG. 7, and parameters used to determine the continuous period include both continuation of time and continuation of the traveling distance.

The operation monitoring unit 520 starts counting the continuous period of a state in which the deviation amount 811 is equal to or more than the second threshold 713 from a point of time (PT81) at which the state in which the deviation amount 811 is equal to or more than the second threshold 713 is detected, and if the deviation amount has become less than the second threshold (PT82), resets count of the continuous period. In FIG. 8, PT81 is a point at which the deviation amount 811 calculated by the internal operation becomes equal to or more than the second threshold 713, and the operation monitoring unit 520 starts period measurement at the timing PT81.

When measuring time, for example, an initial time (initial value) is set in the timer as a reference time for continuous period determination. The timer starts counting down the initial time (initial value) at the timing of period measurement start.

On the other hand, when measuring the traveling distance, for example, an initial traveling distance (initial value) is set in the distance counter in the operation monitoring unit 520 as a reference traveling distance for continuous period determination. The distance counter starts counting down the initial traveling distance (initial value) at the timing of period measurement start.

PT82 is a point at which the deviation amount 811 becomes less than the second threshold 713, and the operation monitoring unit 520 stops period measurement at the timing PT82. If continuous period determination using the timer is being performed, by stop determination of the operation monitoring unit 520, the timer performs counter reset of stopping count down and returning the measured time to the initial time (initial value). If continuous period determination using the distance counter is being performed, by stop determination of the operation monitoring unit 520, the distance counter performs counter reset of stopping count down and returning the measured traveling distance to the initial traveling distance (initial value).

PT83 is a point at which the deviation amount 811 calculated by the internal operation becomes equal to or more than the second threshold 713, and the operation monitoring unit 520 resumes period measurement at the timing PT83.

If continuous period determination using the timer is being performed, the timer ends period measurement when the initial time (initial value) has become zero. Based on the end of period measurement by the timer, the operation monitoring unit 520 determines that a state in which the deviation amount 811 is equal to or more than the second threshold 713 has continued for a predetermined period (second period).

If continuous period determination using the distance counter is being performed, the distance counter ends period measurement when the initial traveling distance (initial value) has become zero. Based on the end of period measurement by the distance counter, the operation monitoring unit 520 determines that a state in which the deviation amount 811 is equal to or more than the second threshold 713 has continued for a predetermined period (second period).

If the deviation amount 811 calculated by the internal operation is less than the first threshold, the operation monitoring unit 520 determines that the deviation amount 811 falls within the allowable range, and the processing of the path deviation determination unit 513 that does not output the request signal (ON) for requesting driving takeover is normal, and outputs a signal (normal OK) 825 representing normality determination.

If the deviation amount 811 calculated by the internal operation is equal to or more than the first threshold 712 and less than the second threshold 713, the operation monitoring unit 520 determines that the deviation amount 811 falls within the allowable range, and the processing of the path deviation determination unit 513 that does not output the request signal (ON) for requesting driving takeover is normal, and maintains the output of the signal (normal OK) 825 representing normality determination.

If the deviation amount 811 calculated by the internal operation is equal to or more than the second threshold 713, and the state in which the request signal is not output continues for a predetermined period (second period) (NG determination establishment), the operation monitoring unit 520 determines that an abnormality has occurred in the path deviation determination unit 513 (abnormality determination), and outputs a signal (abnormal (NG) 826) representing abnormality determination.

Other Embodiments

A vehicle control program that implements one or more functions described in the embodiments is supplied to a system or an apparatus via a network or a storage medium, and one or more processors in the computer of the system or the apparatus can load the program and execute it. The present invention can also be implemented By such an aspect.

Summary of the Embodiment

Arrangement 1. A vehicle control apparatus (for example, ECU 20A in FIGS. 4 and 5A) according to the above-described embodiment is a vehicle control apparatus (for example, ECU 20A in FIGS. 4 and 5A) comprising: a track generation unit (for example, 510 in FIG. 5A) configured to generate a target track of a vehicle (for example, V in FIG. 1); an automated driving control unit (for example, 511 in FIG. 5A) configured to perform automated driving control of automatically controlling steering of the vehicle based on the target track generated by the track generation unit (510); a recognition unit (for example, 512 in FIG. 5A) configured to recognize a traveling state of the vehicle traveling based on the automated driving control; and a path deviation determination unit (for example, 513 in FIG. 5A) configured to output a request signal for requesting driving takeover if a deviation amount of information representing the traveling state with respect to the target track is not less than a first threshold, the apparatus further comprising an operation monitoring unit (for example, 520 in FIG. 5A) configured to monitor processing of the path deviation determination unit, wherein the operation monitoring unit (520) determines that an abnormality has occurred in the path deviation determination unit (513) if the deviation amount of the information representing the traveling state with respect to the target track (610), which is calculated using the information (for example, the position information (traveling track) of the vehicle V, the steering angle, the rotation angle (yaw angle) of the vehicle V about a vertical axis, the rotation angular speed (yaw rate), and the like) representing the traveling state of the vehicle and the target track (for example, 610 in FIG. 6), is not less than a second threshold (for example, 713 in FIGS. 7 and 8) larger than the first threshold (for example, 712 in FIGS. 7 and 8), and a state in which the request signal is not output continues for a predetermined period (for example, the second period in FIGS. 7 and 8).

According to the vehicle control apparatus of Arrangement 1, it is possible to determine an abnormal state in which the request signal for requesting driving takeover is not output notwithstanding a deviation from the target track.

Arrangement 2. In the vehicle control apparatus (ECU 20A) according to the above-described embodiment, upon determining that the abnormality has occurred in the path deviation determination unit (513), the operation monitoring unit (520) suppresses the automated driving control by the automated driving control unit (511).

According to the vehicle control apparatus of Arrangement 2, if it is determined that an abnormality has occurred in the path deviation determination unit, it is possible to suppress execution of automated driving control and enable execution of automated driving control in a state in which each component of the vehicle control apparatus is normal.

Arrangement 3. In the vehicle control apparatus (ECU 20A) according to the above-described embodiment, upon determining that the abnormality has occurred in the path deviation determination unit (513), the operation monitoring unit (520) inhibits reactivation of the automated driving control by the automated driving control unit (511) after an end of the automated driving control of the vehicle (V).

According to the vehicle control apparatus of Arrangement 3, if it is determined that an abnormality has occurred in the path deviation determination unit, it is possible to inhibit reactivation of automated driving control by the automated driving control unit after the end of automated driving control and enable execution of automated driving control in a state in which each component of the vehicle control apparatus is normal.

Arrangement 4. The vehicle control apparatus (ECU 20A) according to the above-described embodiment further comprises a first storage unit (for example, 514 in FIG. 5) and a second storage unit (for example, 521 in FIG. 5) each configured to store the information representing the traveling state of the vehicle, which is acquired based on a detection result of a detection unit (for example, the camera 31A, the LiDAR 32A, the gyro sensor 33A, the GPS sensor 28b, and the like in FIGS. 1 and 4), wherein the track generation unit (510), the automated driving control unit (511), the recognition unit (512), and the path deviation determination unit (513) access the first storage unit (514) at a first access frequency, and execute processing based on the information representing the traveling state, which is stored in the first storage unit, and the operation monitoring unit (520) calculates the deviation amount of the information representing the traveling state with respect to the target track using the information representing the traveling state acquired from the second storage unit (521) by accessing the second storage unit (521) at a second access frequency lower than the first access frequency and the target track generated by the track generation unit (510), and monitors the processing of the path deviation determination unit (513) based on the calculated deviation amount.

According to the vehicle control apparatus of Arrangement 4, in the operation monitoring unit of the high reliability processing apparatus, the contents of processing are limited as compared to processing of the high performance processing apparatus (the track generation unit, the automated driving control unit, the recognition unit, and the path deviation determination unit), and the operation monitoring unit is specialized to processing of monitoring the path deviation determination unit. When the operation monitoring unit accesses the second storage unit at the second access frequency lower than the first access frequency, more reliable processing in which a memory error such as a RAM transfer error is suppressed can be implemented, as compared to the processing of the path deviation determination unit and the like, which access the first storage unit at the first access frequency.

Arrangement 5. In the vehicle control apparatus (ECU 20A) according to the above-described embodiment, the operation monitoring unit (520) starts counting a continuous period of a state in which the deviation amount is not less than the second threshold (713) from a point of time at which the state in which the deviation amount calculated by the operation monitoring unit (520) is not less than the second threshold is detected, and if the deviation amount has become less than the second threshold, resets count of the continuous period.

According to the vehicle control apparatus of Arrangement 5, in a case in which the deviation amount calculated by the operation monitoring unit temporarily exceeds the second threshold, it is possible to suppress determining that processing of the path deviation determination unit is not normal (abnormality determination). This makes it possible to perform more reliable determination processing.

Arrangement 6. A vehicle (for example, the vehicle V in FIG. 1) according to the above-described embodiment comprises a vehicle control apparatus (for example, the ECU 20A in FIGS. 4 and 5A) described in one of Arrangement 1 to Arrangement 5.

According to the vehicle of Arrangement 6, it is possible to provide a vehicle including a vehicle control apparatus capable of determining an abnormal state in which the request signal for requesting driving takeover is not output notwithstanding a deviation from the target track.

Arrangement 7. A vehicle control method of a vehicle control apparatus according to the above-described embodiment is a vehicle control method of a vehicle control apparatus (for example, ECU 20A in FIGS. 4 and 5A) including a track generation unit (for example, 510 in FIG. 5A) configured to generate a target track of a vehicle (for example, V in FIG. 1); an automated driving control unit (for example, 511 in FIG. 5A) configured to perform automated driving control of automatically controlling steering of the vehicle based on the target track generated by the track generation unit, a recognition unit (for example, 512 in FIG. 5A) configured to recognize a traveling state of the vehicle traveling based on the automated driving control, a path deviation determination unit (for example, 513 in FIG. 5A), and an operation monitoring unit (for example, 520 in FIG. 5A), the method comprising steps of:

outputting, by the path deviation determination unit (513), a request signal for requesting driving takeover if a deviation amount of information representing the traveling state with respect to the target track is not less than a first threshold (for example, S506 in FIG. 5B); and monitoring processing of the path deviation determination unit by the operation monitoring unit (520) (for example, S513 to S517 in FIG. 5B), wherein in the step of monitoring, if the deviation amount of the information representing the traveling state with respect to the target track, which is calculated using the information representing the traveling state of the vehicle and the target track, is not less than a second threshold larger than the first threshold, and a state in which the request signal is not output continues for a predetermined period, it is determined that an abnormality has occurred in the path deviation determination unit.

According to the vehicle control method of the vehicle control apparatus of Arrangement 7, it is possible to determine an abnormal state in which the request signal for requesting driving takeover is not output notwithstanding a deviation from the target track.

The invention is not limited to the foregoing embodiments, and various variations/changes are possible within the spirit of the invention.

What is claimed is:

1. A vehicle control apparatus comprising:
   at least one processor circuit with a memory comprising instructions, that when executed by the processor circuit, causes the at least one processor circuit to at least:
   generate a target track of a vehicle;
   perform automated driving control of automatically controlling steering of the vehicle based on the target track of the vehicle;
   recognize a traveling state of the vehicle traveling based on the automated driving control; and
   output a request signal for requesting driving takeover if a deviation amount of information representing the traveling state with respect to the target track is not less than a first threshold,
   the apparatus further comprising
   a first storage unit and a second storage unit each configured to store the information representing the traveling state of the vehicle, which is acquired based on a detection result of a detection unit, and
   the instructions, that when executed by the processor circuit, further cause the at least one processor circuit to at least:

monitor processing of the output of the request signal for requesting driving takeover if the deviation amount of information representing the traveling state with respect to the target track is not less than the first threshold; and access the first storage unit at a first access frequency, and execute processing based on the information representing the traveling state, which is stored in the first storage unit, the deviation amount of the information representing the traveling state is calculated with respect to the target track using the information representing the traveling state acquired from the second storage unit by accessing the second storage unit at a second access frequency lower than the first access frequency and the target track of the vehicle, and monitors the processing of the output of the request signal for requesting driving takeover based on the calculated deviation amount, and wherein a determination is made that an abnormality has occurred in the outputting of the request signal for requesting driving takeover if the deviation amount is not less than a second threshold larger than the first threshold, and a state in which the request signal is not output continues for a predetermined period.

2. The apparatus according to claim 1, wherein upon determining that the abnormality has occurred, the automated driving control is suppressed.

3. The apparatus according to claim 1, wherein upon determining that the abnormality has occurred, reactivation of the automated driving control is inhibited after an end of the automated driving control of the vehicle.

4. The apparatus according to claim 1, wherein the instructions, that when executed by the processor circuit, further cause the at least one processor circuit to at least:

start counting a continuous period of a state in which the deviation amount is not less than the second threshold from a point of time at which the state in which the deviation amount calculated is not less than the second threshold is detected, and if the deviation amount has become less than the second threshold, resets count of the continuous period.

5. A vehicle comprising a vehicle control apparatus described in claim 1.

6. A vehicle control method of a vehicle control apparatus including at least one processor circuit with a memory comprising instructions, that when executed by the processor circuit, causes the at least one processor circuit to at least:

generate a target track of a vehicle, perform automated driving control of automatically controlling steering of the vehicle based on the target track of the vehicle, recognize a traveling state of the vehicle traveling based on the automated driving control, a path deviation determination unit, and an operation monitoring unit, the method comprising steps of:

outputting, by the path deviation determination unit, a request signal for requesting driving takeover if a deviation amount of information representing the traveling state with respect to the target track is not less than a first threshold;

monitoring processing of the path deviation determination unit by the operation monitoring unit, storing, in a first storage unit and a second storage unit each, the information representing the traveling state of the vehicle, which is acquired based on a detection result of a detection unit, accessing the first storage unit at a first access frequency, and executing processing based on the information representing the traveling state, which is stored in the first storage unit, wherein in the step of monitoring, the deviation amount of the information representing the traveling state is calculated with respect to the target track using the information representing the traveling state acquired from the second storage unit by accessing the second storage unit at a second access frequency lower than the first access frequency and the target track of the vehicle, and the processing of the path deviation determination unit is monitored based on the calculated deviation amount, and wherein in the step of monitoring, if the deviation amount is not less than a second threshold larger than the first threshold, and a state in which the request signal is not output continues for a predetermined period, it is determined that an abnormality has occurred in the path deviation determination unit.

* * * * *